3,196,005
PROCESS FOR SEPARATING NICKEL AND COBALT FROM IRON
Robert W. Moore, North Attleboro, Mass., assignor to Attleboro Refining Company, Inc., Attleboro, Mass., a corporation of Massachusetts
No Drawing. Filed Dec. 31, 1962, Ser. No. 248,230
10 Claims. (Cl. 75—108)

My invention relates to the refining of nickel and cobalt, and particularly to a novel process for separating nickel and cobalt from iron.

Nickel and cobalt frequently occur in nature in combination with relatively large amounts of iron. Industrial processes also produce as by-products combinations of iron, cobalt and nickel; for example, the spent electrolyte employed in the electrolytic refining of copper commonly contains impure nickel sulfate together with ferrous and ferric iron. A typical solution of this kind may contain from 50 to 100 grams per liter of nickel and from 20 to 70 grams per liter of iron. Much effort has been devoted to attempts to separate mixtures of this kind, and numerous processes have been developed which are more or less successful in removing small amounts of contaminating iron from starting materials containing relatively high percentages of nickel and cobalt. However, prior to my invention, so far as I am aware, the removal of iron from solutions containing nickel or cobalt without high losses of the desired metal could not be accomplished without the use of expensive equipment or costly reagents. High losses of nickel or cobalt relative to the amounts or iron removed are quite tolerable where the starting materials have high ratios of nickel or cobalt to iron, but would obviously be prohibitive in the case of starting materials containing similar amounts of iron and nickel or cobalt. It is the primary object of my invention to make possible the economical separation of nickel and cobalt from starting materials heavily contaminated with iron.

It is known that as an acid solution of ferric, nickel and cobalt salts is neutralized by the addition of an alkali, hydrolysis takes place with the precipitation of complex basic salts. A prior process for the separation of iron from nickel and cobalt is based on the fact that ferric salts hydrolyze and separate out as a flocculent precipitate at a pH of about 4, whereas nickel and cobalt salts precipitate at a pH of 6. In practice, an aqueous solution of ferric, ferrous, and nickel sulfates is adjusted to a pH in the range of 4 to 5, and an oxidizing agent such as air or $M_nO_2$ is added with agitation. The ferrous ions are oxidized to the ferric state during this process, and the iron separates out as a brown flocculent precipitate of $Fe_2(SO_4)_3 \cdot Fe(OH)_3 \cdot (H_2O)_x$, in which $x$ represents a variable amount of water of hydration. However, it has been found that the precipitate contains nickel in amounts equal to between 20 and 100 percent of the iron. Presumably, the basic ferric sulfate precipitate forms so rapidly that quantities of nickel become entrapped; in theory, nickel so entrapped should redissolve, but it is not found to do so. By the process of my invention, I have found it possible to prevent the deposition of nickel in the iron mud formed by the hydrolysis of ferric iron, whereby a much sharper separation is made possible, and starting materials containing as little as 0.2 pound of nickel per pound of iron can be treated economically.

In carrying out my invention, starting with a solution of ferrous and ferric iron containing nickel or cobalt, or both, I first oxidize the ferrous ions to the ferric state at a pH of 2 or less. This may be done by the addition of nitric acid as the acidifying and oxidizing agent, or the oxidation may be carried out with other oxidizing agents such as $M_nO_2$, persulfates, hydrogen peroxide, potassium permanganate, or the like. The oxidized solution is then adjusted to a pH of about 3.9 to 4.2 with an alkaline agent such as $Na_2CO_3$, $CaCO_3$, $NaHCO_3$, or the like. At this pH, the iron becomes colloidal, though it does not flocculate. The color of the syrupy solution, if not marked by other impurities, changes from a clear green to a dark brown. Next, the solution is diluted with from at least 10 to 20 volumes of water. I have found that the dilution causes the iron to come down as a flocculent precipitate, which settles readily, and which contains only from 0.0004 to 0.003 pound of nickel or cobalt per pound of iron. The amount of water added is not particularly critical, so long as it is sufficient to precipitate the iron.

The manner in which my invention can best be carried out may be seen from the following examples, which also serve to illustrate the flexibility of the process of my invention.

EXAMPLES 1-28.—PROCEDURES

In order to illustrate the process of my invention as applied to various starting solutions, a number of solutions were made up from typical samples of spent copper refining electrolyte, each containing a different amount of nickel sulfate and iron sulfate in water, together with small amounts of free sulfuric acid, and various amounts of other impurities which are typically found in such solution, such as Cr, Mo, Al, Mn, Zn and Cu. As will appear, these latter impurities play no part in the process of my invention; they do not noticeably affect the reaction mechanism, and to the extent that they remain in solution, may later be separated from the nickel by inexpensive conventional methods. In order to illustrate the process as applied to cobalt containing solutions, and, by reason of the known similarity in the chemical behavior of cobalt and nickel, to show that the other metal ions present in the electrolyte starting material do not affect the process of my invention, solutions containing cobalt and iron sulfates were made up from distilled water, concentrated sulphuric acid, and reagent grade cobalt and iron sulfates. The initial volume of each of the nickel and cobalt containing solutions was 200 cc. Each solution was heated and maintained at a temperature of 180° F.–210° F. while small amounts of concentrated nitric acid were added with agitation. The addition of nitric acid was continued until spot tests showed that all of the ferrous ions had been converted to the ferric state. The solutions were then allowed to cool to 150°–180° F., primarily to keep down excessive foaming; however, this step is not necessary from the chemical standpoint. Next, an aqueous solution of hot saturated sodium carbonate at 160° F. was added until the pH of the solution was between 3.8 and 4.2. Each sample was then diluted 15 fold by the addition of 2800 cc. of tap water having a pH of 6.0, the final volume of each solution being 3000 cc. A flocculent precipitate was formed, which settled readily. This precipitate was washed by decantation three times with 3000 cc. portions of tap water, and then filtered on a Büchner suction filter with three displacement washings, of 200 cc. of water each, to remove the soluble nickel or cobalt content. The iron mud precipitate was then analyzed by standard wet chemical methods for its iron and nickel or cobalt content. The initial composition of the solutions, and the analysis of the resulting precipitates in terms of the weight ratio of nickel or cobalt to iron, are given in the following tables. The nickel or cobalt remaining in solution in the various examples could be recovered as the sulfate salt, containing less than 0.01 per cent of Fe by weight based on the salt.

*Table I*

| Example | Starting Solution | | | | Iron Mud Precipitate, Nickel/Iron, Weight Ratio |
|---|---|---|---|---|---|
| | $H_2SO_4$, Grams/Liter | Nickel, Grams/Liter | Iron, Grams/Liter | Nickel/Iron, Weight Ratio | |
| 1 | 42.4 | 28.4 | 2.1 | 13.5 | .003 |
| 2 | 43.6 | 29.2 | 4.2 | 6.95 | .009 |
| 3 | 53.6 | 36.0 | 8.5 | 4.23 | .007 |
| 4 | 53.6 | 36.0 | 8.5 | 4.23 | .007 |
| 5 | 53.6 | 36.0 | 8.5 | 4.23 | .008 |
| 6 | 75 | 50.3 | 16.8 | 3.00 | .005 |
| 7 | 75 | 50.3 | 16.8 | 3.00 | .006 |
| 8 | 145 | 97.0 | 35.0 | 2.76 | .006 |
| 9 | 26.2 | 17.6 | 10.6 | 1.66 | .010 |
| 10 | 75 | 50.3 | 33.5 | 1.50 | .006 |
| 11 | 75 | 50.3 | 50.0 | 1.005 | .008 |
| 12 | 13.1 | 8.8 | 10.6 | .83 | .007 |
| 13 | 8.3 | 5.55 | 21.2 | .262 | .0019 |
| 14 | 8.3 | 5.55 | 10.6 | .0525 | .005 |
| 15 | 6.6 | 4.4 | 10.6 | .0415 | .0029 |
| 16 | 3.3 | 2.2 | 10.6 | .0208 | .0014 |
| 17 | 1.7 | 1.1 | 10.6 | .0104 | .0027 |
| 18 | .8 | .55 | 10.6 | .0052 | .0004 |
| 19 | .8 | .55 | 21.2 | .0026 | .0007 |

*Table II*

| Example | Starting Solution | | | | Iron Mud Precipitate, Cobalt/Iron, Weight Ratio |
|---|---|---|---|---|---|
| | $H_2SO_4$, Grams/Liter | Cobalt, Grams/Liter | Iron, Grams/Liter | Cobalt/Iron, Weight Ratio | |
| 20 | 50 | 11.1 | 2.25 | 3.26 | .0025 |
| 21 | 75.2 | 16.7 | 5.55 | 3.00 | .004 |
| 22 | 50 | 11.1 | 5.55 | 2.00 | .003 |
| 23 | 50 | 11.1 | 5.55 | 2.00 | .0028 |
| 24 | 79.5 | 17.66 | 11.1 | 1.66 | .001 |
| 25 | 50 | 11.1 | 11.1 | 1.00 | .002 |
| 26 | 20 | 4.4 | 11.1 | .396 | .001 |
| 27 | 5 | 1.1 | 11.1 | .10 | .001 |
| 28 | 2.5 | .55 | 22.2 | .025 | .0008 |

As will be seen from the tabulated examples, the efficiency of the process of my invention is essentially unaffected by the concentration and relative proportions of the iron and nickel or cobalt in the starting solutions. Referring to Table I, the concentration of nickel in the precipitate remains very low over the range of nickel to iron ratios of 13.5 to .0026, with only .003 pound of nickel per pound of iron in the precipitate at the highest concentration, and .007 pound per pound at the lowest. The lower and higher values encountered at intermediate starting ratios of nickel to iron show that the degree of separation is essentially independent of the starting ratio. Also, the total amounts of iron and nickel in the starting solution do not appear to significantly affect the result. Table II shows that the same results may be obtained in the separation of iron from cobalt.

The nickel or cobalt remaining in the solutions from which the iron has been separated as described above may be recovered in any suitable conventional manner, depending upon the desired product. For example, they may be precipitated as carbonates, sulfides, hydroxides, or ammonium sulfates. They may also be recovered by electrolysis or by hydrogen reduction from ammoniacal solution, or they may be crystallized out after partial evaporation. If desired, the wash water may be recycled.

On an industrial scale, the process of my invention was carried out with the aid of four 22,000 gallon settling tanks, having conical bottoms comprising 20 percent of the total volume and provided with agitators. The initial charge for these tanks consisted of 1200 to 1800 gallons of spent electrolyte which had been oxidized with nitric acid and brought to a pH between 3.9 and 4.2 with a hot saturated aqueous solution of soda ash. The electrolyte starting material used contained from 20 to 70 grams per liter of Fe, from 50 to 100 grams per liter of Ni, and various other contaminants such as Cr, Mo, Al, Mn, Zn and Cu; some of these contaminants, notably Mo, Cr and Al, are removed with the iron in the process of my invention, whereas the others are readily separated from the Ni, if desired, by known conventional methods.

A first of the charged tanks was filled with water at temperatures ranging from 45 to 50 or 55 degrees, depending on the weather, agitated, and allowed to settle. The clear liquid was then pumped from an outlet pipe just above the conical bottom of the tank to a second tank, to serve as the diluent for the charge in that tank. The liquid from the first tank had a pH of 4.0 to 4.2 and contained from 6 to 10 grams per liter of Ni. After the second tank had been agitated, and the flocculate of iron mud had been allowed to settle, the clear liquid was found to have the same pH, of 4.0 to 4.2, and to contain from 12 to 20 grams per liter of Ni. This liquid was then used as the diluent in the third tank; after agitation and settling, the pH remained the same, but the nickel content increased to from 18 to 30 grams per liter. The supernatant liquid in the third tank was charged to the fourth tank in the same manner, where the nickel content rose to from 24 to 40 grams per liter, with the pH remaining at 4.0. The supernatant liquid in the fourth tank was then desalted to remove the nickel sulfate and other dissolved minerals, whereupon the water was recycled. In the meantime, first and second washes were applied to the iron mud in the other tanks in conventional batch countercurrent fashion. In passing from the first tank to the fourth tank, after introduction from the bottom in each tank, agitation and settling, the first wash stream picked up about 1.5 to 2 grams per liter in each tank; after settling in the fourth tank, it was introduced into a fresh charge of 1200 to 1800 gallons added to the precipitate in the first tank. The third stream, introduced to the first tank after the second stream and passed to the second, third, and fourth tanks, picked up from 1.5 to 2 grams per liter of nickel in each tank, emerging from the fourth tank as the next first wash stream. The manner in which the concentration of each stream was then increased to a desired value, and the stream then desalted to provide a fresh water stream, will be readily apparent to those skilled in the art. The significant aspect of this batch countercurrent process is that dilution of a charge with a stream having a pH as low as 4 will serve to precipitate the iron without carrying down the nickel. In the process, a nickel solution is obtained from which nickel sulfate was recovered which contained less than .01 percent by weight of Fe based on the nickel sulfate.

As noted above, the degree of dilution in the process of my invention is not particularly critical, within practical limits which I have found by experimenting with different dilutions. Specifically, in successively diluting prepared samples with 2, 4, 6, 8 and 10 volumes of water per volume of treated electrolyte, I have found that at about 8 volumes, the iron may precipitate or not; it is more likely to do so if the water is hot than if it is cold, and in any event, if more water is added, more iron will usually come out. Increasing the water temperature, or increasing the amount of water used for dilution, will aid the flocculation process. The addition of 10 volumes of water ensures the flocculation of substantially all of the iron even with cold water at 50° F. or more. Cold water tends to form a finer flocculate, which settles more slowly but more compactly, to a smaller final volume, than the coarser flocculate formed by hot water in the 10–200° F. range. The latter settles more rapidly, however, and may be preferred where the additional volume can be handled conveniently and the required heat is available at a reasonable cost.

While I have described the process of my invention with respect to the details of specific examples, many changes and variations will be apparent to those skilled in the art upon reading my description, and such may obviously be made without departing from the scope of my invention.

Having thus described my invention, what I claim is:

1. The process of removing iron from an aqueous solution containing ions of the class consisting of ferrous and mixtures of ferrous and ferric and ions of the class consisting of nickel and cobalt, comprising the steps of oxidizing the ferrous ions to the ferric state at a pH not greater than 2, increasing the pH of the solution to between about 3.9 to 4.2, diluting the solution with from 8 to 20 volumes of water per volume of the solution to form an iron-containing precipitate, and separating the precipitate from the solution.

2. The process of separating iron from a solution having a pH not greater than 2.5 and containing ferric ions and ions of the class consisting of nickel and cobalt, comprising the steps of adding an alkaline agent of the class consisting of the water soluble carbonates and bicarbonates in an amount sufficient to raise the pH of the solution to about 3.9 to 4.2 and then adding water in amounts sufficient to cause the iron to precipitate.

3. The process of separating iron from a solution having a pH between 3.8 and 4.2 and containing ferric ions and ions of the class consisting of nickel and cobalt, comprising the step of adding liquid water to the solution at atmospheric pressure in an amount sufficient to cause the iron to precipitate.

4. In the process of recovering a member of the class consisting of nickel and cobalt from a solution containing ions of said class and ferric ions and having a pH between 3.8 and 4.2, the step of diluting the solution with an amount of liquid water at atmospheric pressure and sufficient to precipitate the ferric ions.

5. In the process of recovering metals of the class consisting of nickel and cobalt from a solution containing ions of said class and ferrous iron, the steps comprising adding nitric acid in amounts sufficient to oxidize the ferrous ions to the ferric state and reduce the pH of the solution to not greater than 2, adding an aqueous solution of an alkali in amounts sufficient to raise the pH to about 3.9 to 4.2, diluting the solution with sufficient water to hydrolyze the iron to form an iron-containing precipitate and separating the resultant iron-containing precipitate from the solution.

6. In the process of recovering metals of the class consisting of nickel and cobalt from a solution containing ions of said class and ferrous iron, the steps of oxidizing the ferrous ions to the ferric state while maintaining the pH of the solution at not greater than 2, raising the pH of the solution to a value below between 3.8 and 4.2 by the addition of sodium carbonate, and adding sufficient water to precipitate the ferric ions.

7. In the process of recovering metals of the class consisting of nickel and cobalt from an aqueous solution containing metals of said class and iron and having a pH below 3.9, the steps of raising the pH of the solution to about 3.9 to 4.2 with an alkaline agent having a pH above 7 and then adding water until the iron is precipitated.

8. The process of extracting iron from a solution containing ions of the class consisting of ferrous and mixtures of ferrous and ferric and ions of the class consisting of nickel and cobalt, comprising the steps of adding sufficient nitric acid to the solution to oxidize the ferrous ions to the ferric state, adjusting the pH of the solution to a value between 3.8 and 4.2 with an alkaline agent of the class consisting of the water soluble carbonate and bicarbonate salts, charging the solution into at least two containers, diluting the solution in the first container with at least 8 volumes of water per volume of solution in the first container, settling the resultant iron-containing precipitate, and decanting the supernatant liquid into the second container.

9. In the process of separating iron from a solution having a pH from 3.8 to 4.2 and containing ferric ions and ions of the class consisting of nickel and cobalt, the steps of charging the solution in two portions to two containers, diluting the solution in the first container with at least 8 volumes of water per volume of solution in the first container, and transferring the liquid in the first container to the second container.

10. The process of separating iron from a solution containing from 50 100 grams per liter of ions of the class consisting of nickel and cobalt and from 20 to 70 grams per liter of ferric iron, the solution having a pH in the range of 3.8 to 4.2, comprising separating the solution into an ordered plurality of batches, diluting the first batch with a first quantity of at least 8 volumes of water per volume of the first batch while agitating the batch, settling the resultant iron-containing precipitate, transferring the resultant supernatant liquid from batch to batch with agitation and settling in each batch until each batch has been diluted, agitated, and settled, removing the supernatant liquid from the last batch, washing each batch of iron-containing precipitate with at least a second quantity of at least 8 of said volumes of water transferred from batch to batch with agitation and settling in the same manner as the first quantity and removing the supernatant liquid from the last batch of precipitate.

References Cited by the Examiner

UNITED STATES PATENTS

| 981,451   | 1/11 | McKechnie | 75—119   |
| 2,831,751 | 4/58 | Birner    | 75—119 X |
| 2,867,503 | 1/59 | Roy       | 75—119 X |
| 3,000,727 | 9/61 | Matson    | 75—119 X |

OTHER REFERENCES

Pauling: General Chemistry, 2nd edition, W. H. Freeman & Co., 1954, San Francisco.

BENJAMIN HENKIN, *Primary Examiner.*

DAVID L. RECK, *Examiner.*